United States Patent [19]

Mange et al.

[11] Patent Number: 4,846,054

[45] Date of Patent: Jul. 11, 1989

[54] APPARATUS FOR EXTRACTING FAT FROM AN ANIMAL MATERIAL

[75] Inventors: Christian Mange, Paris; Jean-Yves Toze, Chantilly, both of France

[73] Assignee: Clextral, Courbevoie, France

[21] Appl. No.: 159,075

[22] Filed: Feb. 23, 1988

Related U.S. Application Data

[62] Division of Ser. No. 853,075, Apr. 17, 1986, Pat. No. 4,746,464.

[30] Foreign Application Priority Data

Apr. 17, 1985 [FR] France ..... 85 05806

[51] Int. Cl.[4] ..... A23P 1/00

[52] U.S. Cl. ..... 99/495; 99/470; 99/483; 100/117; 100/145; 366/75; 366/84; 366/88; 366/90; 366/149; 366/321; 366/324

[58] Field of Search ..... 99/483, 470, 495, 510, 99/511; 366/297, 292, 75, 85, 88, 86, 84, 87, 79, 318, 144, 301, 149, 90, 321, 324; 100/117, 145, 37, 94; 425/207-209

[56] References Cited

U.S. PATENT DOCUMENTS

| | | | |
|---|---|---|---|
| 3,035,306 | 5/1962 | Rossiter | 100/37 |
| 3,814,563 | 6/1974 | Slaby et al. | 100/117 X |
| 3,917,507 | 11/1975 | Skidmore | 366/83 X |
| 4,401,023 | 8/1983 | Suhr et al. | 100/117 X |
| 4,679,498 | 7/1987 | Chaveron et al. | 366/85 X |
| 4,752,135 | 6/1988 | Loomans | 366/85 |

*Primary Examiner*—Timothy F. Simone
*Attorney, Agent, or Firm*—Pollock, Vande Sande & Priddy

[57] ABSTRACT

The invention relates to a process and an apparatus for extracting fat from an animal material in which according to the invention, the fat is continuously melted and then extracted by passing the animal material through two successive zones, namely a melting zone (B) and an extraction zone (C), of a single housing in the form of an elongate sleeve (1) equipped, in the melting zone (B), with heating means (13) and, in the extraction zone (C), with filtering walls (16) for the passage of the melted fat, the sleeve (1) encasing two overlapping conveyor screws (2) driven in rotation.

4 Claims, 1 Drawing Sheet

APPARATUS FOR EXTRACTING FAT FROM AN ANIMAL MATERIAL

This is a division of application Ser. No. 853,075, filed Apr. 17, 1986, now U.S. Pat. No. 4,746,464.

FIELD OF THE INVENTION

The invention relates to an apparatus for extracting fat from an animal material and applies particularly to the recovery of fat contained in slaughterhouse waste.

BACKGROUND OF THE INVENTION

In slaughterhouses, after the meat and, in general terms, the useful parts have been cut off, various products, such as the skin, blood, viscera, etc., remain, and these are sometimes referred to, as a whole, as the "fifth quarter". The skin and the blood can be recovered separately, but the other products have to be eliminated, while being exploited as much as possible. However, these products include a considerable proportion of adipose material or, at all events, a material containing a substantial proportion of fatty material. This is usually associated with at least a certain proportion of water within cells limited by membranes of protein tissue, called collagen.

In general, slaughterhouse waste which does not have a particular use contains a considerable proportion of fatty material associated at least with water and with a protein tissue. To exploit these products, they are therefore conventionally subjected to an increase in temperature, making it possible to melt the fatty material in order to separate the melted fat from the residue containing the proteins. Usually, the material is heated in large vats, either by injecting steam or by heating the wall of the vat, and this process, called "dry melting", avoids the need to add to the material a quantity of water which would subsequently have to be eliminated. To achieve a sufficient output, it is customary to process substantial quantities of material in large-size installations. When the melting of the fatty material is completed, it is extracted, for example by means of pressing in a screw press, making it possible to discharge the melted fat by filtration, the residue, called "crackling", being recovered separately.

To date, the installations of this type have operated intermittently and with different appliances each designed for their own particular function. Furthermore, even when the dry-melting process is used, it is necessary to process large quantities of animal material, and the installations cause a great deal of pollution. Consequently, the fat is recovered in separate factories which are sometimes at a great distance from the slaughterhouses, and as a result the animal material first has to be recovered in all the slaughterhouses and then stored for a certain length of time before being processed, but this again entails risks of pollution of all kinds and results, moreover, in a deterioration of the material which makes it necessary to carry out subsequent refining.

SUMMARY OF THE INVENTION

The object of the invention is a new apparatus making it possible to overcome such disadvantages.

According to the invention, the fat is continuously melted and then extracted by passing the animal material through at least two successive zones, namely, a melting zone and an extraction zone, of a single housing in the form of an elongate sleeve equipped, in the melting zone, with heating means and, in the extraction zone, with filtering walls for the passage of the melted fat, the said sleeve encasing two overlapping conveyor screws driven in rotation, and the animal material, introduced continuously via a feed orifice located at one end, in particular the upstream end, of the sleeve and driven downstream as a result of the rotation of the screws, is subjected successively, in the melting zone, to progressive heating up to the water vaporization temperature, with a combined effect of kneading and of an increase in pressure to a sufficient level to maintain the superheated water in the dissolved state, and then to sudden expansion with the evaporation of the water and discharge of the steam via an orifice made in the central part of the sleeve, the material dried in this way being maintained at the melting temperature of the fat as a result of the heating of the sleeve and then being subjected, in the extraction zone, to an increase in pressure capable of separating the melted fat, discharged via the filtering walls, from the residue which is discharged via an orifice located at the downstream end of the sleeve.

According to another important characteristic of the process, the material, while being conveyed through the screws, is subjected by these, at least in the melting zone, to combined kneading and shearing effects capable of causing the protein tissue to burst open, thus assisting the melting of the fat.

In a preferred embodiment, in the melting zone, the animal material is heated to a temperature of the order of 90° C. during the stage of the increase in pressure and is then reheated to a temperature of the order of 105° C. after the expansion stage, the latter being carried out by decreasing the pressure at the steam discharge orifice. The material can subsequently undergo a further increase in pressure and then expansion with heating up to a temperature of the order of 115° C., before passing into the fat extraction zone. In this zone, the material is advantageously subjected to successive compressions against the filtering walls, with a rolling effect, the residue being extruded under pressure through a die located at the downstream end of the sleeve.

Furthermore, before entering into the melting zone, the animal material introduced via the feed orifice can be subjected to a first pressure increase, making it possible to fill the screws completely and form a continuous plug capable of withstanding the downstream steam pressure, and, during this operation, the temperature of the material is maintained at a level not exceeding approximately 50° C. as a result of the cooling of the sleeve.

The invention also embraces the apparatus for carrying out the process, consisting of a screw conveyor comprising at least two conveyor screws driven in rotation inside an elongate sleeve having at least three successive zones, namely, in the conveying direction of the screws, an upstream feed zone, in which the sleeve is provided with an orifice for introducing the animal material, a central melting zone, in which the sleeve is equipped with heating means and, in its central part, with a degassing orifice opening out widely onto the screws, and a downstream extraction zone, in which the sleeve is equipped with filtering walls for the discharge of the melted fat, the screws being provided with helical flights or other peripheral processing members which determine the downstream conveyance of the material, with a combined kneading, rolling and shearing effect, the said flights consisting of successive sections with varied pitches which, from upstream in the downstream direction, define in the melting zone at least two stages, namely, a pressure increase stage and an expansion stage in line with the central degassing orifice, and, in the extraction zone, an increase in pressure making it possible to expel the melted fat and discharge it via the filtering walls, the residue being discharged via an orifice located at the downstream end of the sleeve.

In an especially advantageous embodiment, the screws are provided, in the melting zone, with flights which successively define, in the conveying direction, a pressure increase section, a first braking section with kneading and shearing, for forming a continuous plug impervious to the water vaporization pressure, a pressurized kneading section, an expansion section and a second braking section with an increase in pressure. Preferably, in the first braking section, the screws are provided with flights having pitches opposing the conveying direction and provided with apertures for the passage downstream of a controlled flow of material with a shearing effect, and in the second braking section the screws consist of a stack of eccentric discs.

BRIEF DESCRIPTION OF THE DRAWINGS

The invention will be understood more clearly from the description of an exemplary embodiment illustrated in the attached drawings.

DESCRIPTION OF PREFERRED EMBODIMENT

Figure 1:
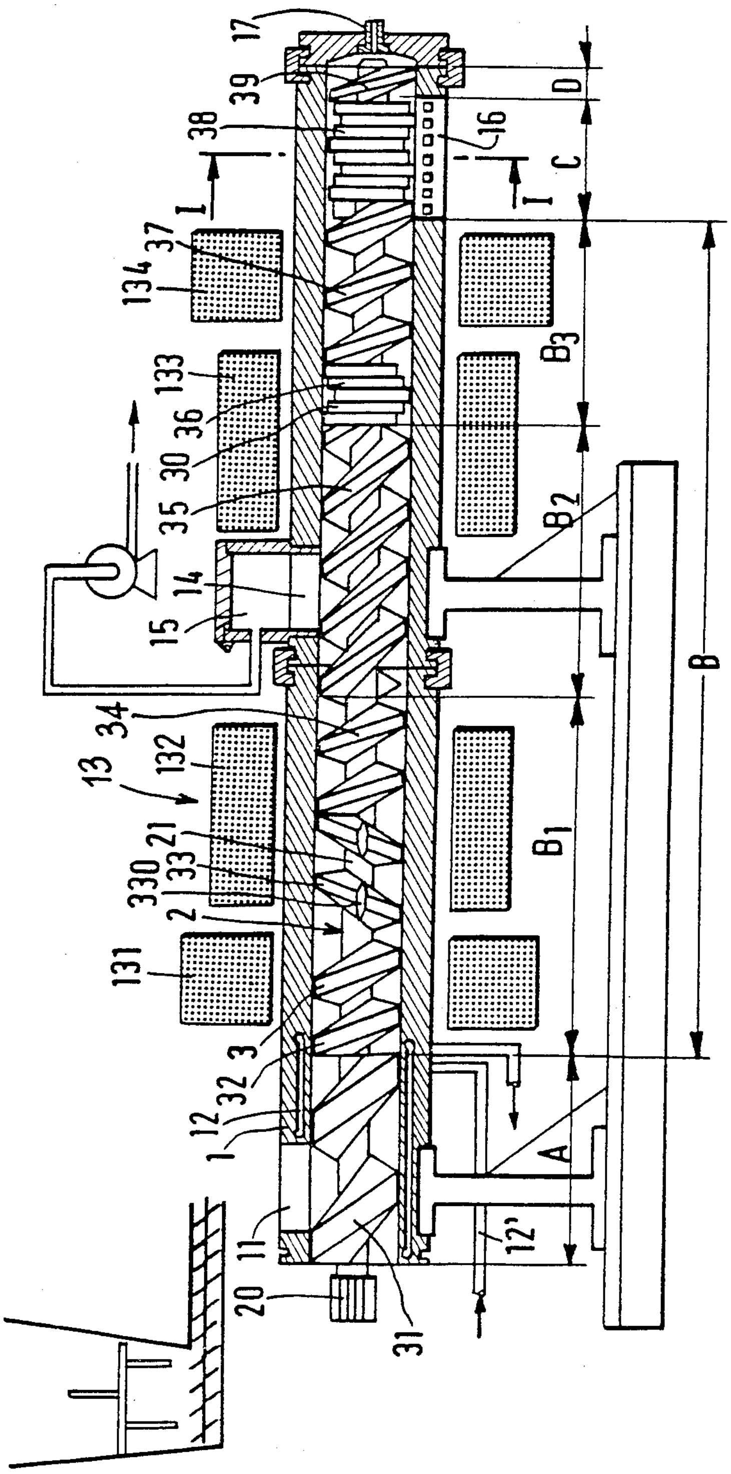
FIG. 1 is a section through a vertical plane passing through the axis of a screw of the apparatus of the present invention.

The machine illustrated schematically in FIG. 1, is of the screw-conveyor type and consists, in general terms, of an elongate housing forming a sleeve 1, inside which are aranged two conveyor screws 2 driven in rotation by a motor 20. Each screw consists of a central shaft 21, around which extend helical flights 3 or other peripheral processing members, such as kneading discs 30 in the example illustrated.

Figure 2:
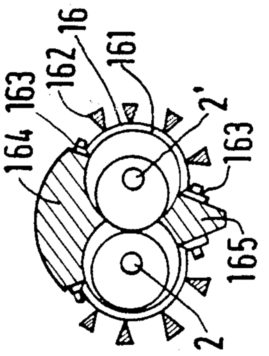
FIG. 2 is a cross-section along line I—I of FIG. 1.

As can be seen in FIG. 2, which is a section through a plane which is transverse to the axes of the screws, the latter overlap one another, and the inner wall of the sleeve 1 forms two intersecting cylindrical lobes of an inside diameter slightly greater than the outside diameter of the flights 3, so as to encase the latter completely. The flights of the two screws 2 and 2' overlap one another, and, in the example illustrated, the two screws are driven in rotation in the same direction, in such a way that the flights are identical and simply offset relative to one another so as to overlap. In FIG. 1, which is a section through a vertical plane passing through the axis of one of the screws, the other screw located at the rear has been omitted in order to simplify the figure.

According to a characteristic of the invention, the screw conveyor 1 consists of several successive zones, each corresponding to a particular function. In general terms, it is possible to distinguish, from upstream in the downstream direction in the conveying direction of the screws, a feed zone A, a zone B for melting the fatty materials, a fat extraction zone C and a residue outlet zone D.

The sleeve 1 is provided at its upstream end with a feed orifice 11 opening out widely onto the two screws 2 and 2'. Over the entire feed zone A which extends in line with the feed orifice 11 and a little downstream of the latter, the sleeve 1 is equipped with a cooling system 12 consisting, for example, of channels formed inside the sleeve and connected to a circuit 12' for the supply and discharge of cooling water.

The melting zone B forms the major part of the sleeve 2 and, in the central part of the latter, extends over at least half its length. In this zone, the sleeve 1 is equipped with heating means consisting, for example, of jackets 13 which surround it on the outside and which can function by induction or by the circulation of a heat exchange fluid. It is preferable to use a certain number of jackets connected to one another, making it possible to adjust the temperatures in successive zones of the melting zone B.

In the central part of the melting zone B, the sleeve is provided with an orifice 14 which opens out widely onto the screws and which discharges into a chamber 15 which can be put into communication with a vacuum pump.

In the extraction zone C, the sleeve is equipped with filtering walls 16 which, as indicated schematically in FIG. 2, can consist of shells covering a large part of the periphery of the screws, according to the arrangement described in French Pat. No. 78/29,370.

Finally, at its downstream end, the sleeve 1 is provided with at least one outlet orifice 17 which can advantageously be formed by two dies, each arranged in the axis of a screw.

According to an embodiment which is already known, the screws advantageously consist of splined shafts on which are strung bushes provided on the inside with corresponding splines and on the outside with peripheral members for conveying and processing the material, such as helical flights or eccentric discs. In this way, each screw can consist of successive sections with varied pitches, the characteristics of which will determine special conditions for the conveying and processing of the material driven as a result of the rotation of the screws, for example an increase in pressure, kneading with a shearing effect, expansion, rolling effects, etc.

Thus, in the embodiment illustrated in the drawing and given purely as an example, the material driven by the screws passes successively through the following stages:

In the feed zone A equipped with coarse-pitch flights 31, the material introduced via the feed orifice 11 is driven rapidly downstream and is distributed within the flights. In this zone, the sleeve 1 is cooled by means of the channels 12, so as to delay the melting of the material in order to help to drive it along by means of the flights.

The material then passes into the melting zone B which extends over the greater part of the machine and at all events over more than half the sleeve, and which can be subdivided into a certain number of successive parts.

In the first part $B_1$, the material is first melted by heating the sleeve by means of a certain number of heating jackets 13.

The feed zone A is followed by a first fine-pitch section 32 which, as a result of a braking effect, makes it possible to fill the flights. Moreover, particularly when the two screws 2 are identical and rotate in the same direction, the material driven by means of a pumping effect tends to pass from one screw to the other, this being conducive to an effect of kneading and of renewing the parts in contact with the sleeve 1. This results in a first increase in temperature, the degree of which can be adjusted by means of a special heating jacket 131 corresponding to the first sector 32 of the screws. This sector is followed by a second section, in which the flights 33 have an opposite pitch and are provided with apertures or ports 330 which are cut in the flights and which extend radially between the shaft 2 and the periphery of the flight 33. These apertures are distributed uniformly round the shaft and in equal numbers on the two screws, and these are wedged in such a way that two apertures simultaneously coincide with one another in the zone of engagement of the two screws. As a result, in this zone, when the ports 330 pass across one another simultaneously and in opposite directions, it becomes possible for a certain quantity of material to pass downstream periodically, while the rest of the material is retained in the flights as a result of the effect of the opposing pitches. This produces an increased compression and kneading effect and, because of the periodic opening and closing of the downstream passage in the engagement zone, a shearing effect which assists the homogenization of the material. Furthermore, friction is intense and increases the temperature of the material, and this in any case can be raised by means of the heating jacket 132 which covers the sector of opposing pitch 33 and the following sector 34. In this sector, the flights have a relatively fine pitch and serve to take up the material leaving the sector 33 of opposing pitch while maintaining the pressure and the kneading effects.

As a result of the combined effect of self-heating attributable to friction and of the heating jackets 131 and 132, the temperature of the material is progressively raised to a temperature of the order of 100° C. The water contained in the material consequently ought to evaporate, but it is maintained dissolved within the material as a result of the compression effect attributable to the screws and to the continuous plug formed by the compressed material in the braking section of opposing pitch 33. This prevents the risk that an emulsion of the fat in the water will form under the effect of the intense kneading generated by the screws. This kneading effect, combined with heating, assists the bursting of the protein tissue and the melting of the fat. The material becomes highly fluid, but can nevertheless be driven by the screws because of the pumping effect attributable to the use of two screws with overlapping flights.

The material then enters the degassing zone $B_2$ which consists of a sector 35 of coarser pitch and in which it undergoes a sudden expansion effect. In this sector 35, it is even possible to use double flights in order to drive rapidly downstream the material which is distributed round the shafts without filling the flights. This consequently assists the evaporation of the water previously dissolved in the material, and the steam generated is sucked through the central orifice 14 which, having a diameter of the order of that of the screws, opens out widely onto these and is covered by a closed chamber 15 connected to a vacuum pump. Since the expanded material does not fill the flights completely, the suction effect can occur over the entire length of the zone $B_2$. This results in complete degassing of the material which, at the end of the zone $B_2$, contains virtually no water at all.

To make this degassing easier and to maintain the temperature of the material as far as possible, the sleeve 1 is surrounded by a heating jacket 133 which starts immediately downstream of the degassing orifice 14 and which extends over the downstream part of the section $B_2$ and over the third part $B_3$ of the melting zone. The latter preferably has a section 33 consisting of a stack of kneading discs. These can advantageously be eccentric, the line of the centers rotating helically round the axis of each screw, as shown in FIG. 2. The effect of these kneading discs is, in particular, to brake the material and consequently increase the filling rate of the flights and the kneading effect in the downstream part of the section 35, thus determining an increase in the temperature which, under the combined reaction of the heating jacket 133, can rise above 100° C., and for example can be of the order of 105° C. Passage through the section 36 also determines a rolling effect which makes it possible to homogenize the material and completely expel the water which can return forwards, passing via the unfilled parts of the flights, in order to be extracted via the orifice 14.

At the outlet of the kneading discs 36, the material is taken up by a section 37 equipped with flights of coarser pitch, in which the dried material, still heated by a heating jacket 134, is homogenized and then compressed again in order to pass into the filtration zone C.

In fact, in this zone, the screws consist of a fairly large number of eccentric kneading discs 38 which determine a braking effect and consequently an effect compressing the material upstream. However, the function of the kneading discs is essentially to crush the material against the sleeve walls which, as shown in FIG. 2, consist of filtering shells 16. These can advantageously be produced in the way described in French Pat. No. 78/29,370 already mentioned. In this embodiment, in fact, the wall consists of parallel hoops 161 arranged substantially in planes perpendicular to the axes of the screws and having, towards the inside, straight faces separated by slits of very small width. The hoops 161 bear on outer guide bars 162 parallel to the axis. The assembly as a whole forms shells equipped at the ends with flanges 163 which can be laid against guide bars 164,165 equipped, towards the inside of the sleeve, with V-shaped cylindrical sectors which form the central part of the sleeve. As shown in FIG. 2, the planes of the flanges 163 advantageously form an angle which opens upwards, in such a way that the gide bar 164 covers a wider sector than the guide bar 165. As a result, the fat, in the liquid state, is discharged more easily via the slits located between the hoops 161 under the action of the kneading discs.

After the fat has been expelled, the residual material, consisting essentially of protein tissue and often called "crackling", is taken up by a final compression section 39 and is extruded via the die 17 located at the downstream end of the sleeve. This final compression and extrusion make it possible to ensure a final expulsion of the fat which is discharged via the filtering zone 16.

As an example, a raw material consisting of slaughterhouse waste, called the "fifth quarter", was processed in a machine of the type described above, having a screw length of the order of 1 m for a center-to-center distance of 45 mm.

The screws were driven at an average speed of 50 revolutions per minute.

The filtering walls consisted of circular bars of a width of 3 mm, separated by gaps of a few tenths of a millimeter.

By cooling or heating the sleeve, the driven material was maintained at a temperature of 50° C. in the feed zone A and then, in succession, 90° C. in the zone $B_1$, 105° C. in the zone $B_2$ and 125° C. in the zone $B_3$.

For a feed rate of 75 kg/h of raw material, approximately 5 kg of steam were extracted via the orifice 14, 30 to 35 kg/h of fat were extracted via the filters 16, and 35 to 40 kg/h of residue were extruded via the die 17.

This production may seem low, if it is compared with the production of conventional installations for extracting fat from animal waste, but in actual fact these installations are of large size and, to be profitable, have to process large quantities of waste which must be collected from several slaughterhouses sometimes very far away. This results in transport and storage operations which involve a risk that the products will be soiled and damaged. Moreover, the pollution caused by the storage of waste is well known.

By means of the process according to the invention, on the contrary, it is possible to link an installation according to the invention to a slaughterhouse of even average size, in order to process the waste as it is produced, and the characteristics of the apparatus can be adapted to the size of the slaughterhouse and to the type of waste. Thus, this is processed immediately, thereby eliminating at one and the same time the risk of deterioration and pollution. It is easily possible to obtain, under these conditions, a fat called the "first juice" with less than 1% acidity, depending on the quality of the raw material. Furthermore, another advantage of the process is that, because the material is maintained at a high temperature during the entire extraction process, there is no risk of contamination.

However, the very process of extracting the fat is likewise of great interest. In fact, by maintaining the water under pressure during the first melting and by carrying out sudden degassing, an emulsion which would make it much more difficult to eliminate the fat is prevented from forming.

The embodiment which has just been described is the simplest, but it could have alternative forms and undergo improvements.

In particular, the special qualities of the screw conveyor can be utilized to carry out chemical processing of the conveyed material by introducing a reagent into the sleeve. For example, if a raw material of mediocre quality were used, an alkali processing zone could be interposed between the melting zone and the extraction zone, thus making it possible to refine the fat before it is extracted. The reagent could be introduced into the sleeve via an orifice made in the corresponding section of the sleeve or, in a simpler way, directly via the inlet orifice (11), upstream of the sleeve, processing starting only after the fat has been melted. As a result of the effects of kneading and homogenization attributable to conveyance in the screws and because of the possibility of accurate adjustment of the temperature, processing could be carried out rapidly in a relatively short section of the sleeve.

Furthermore, to ensure a better extraction of the fat, the extraction zone (C) could be followed by an expansion zone equipped, if required, with means of heating the sleeve to maintain the temperature of the material at the desired level, and then by a second extraction zone equipped with filtering walls associated with kneading discs.

Admittedly, such improvements would entail lengthening the sleeve, and consequently, in general terms, the parameters of the machine, in particular the profile of the screws, the number and length of the various sections, the temperatures, the pressures, etc., will be determined by means of prior tests, in order to allow for the quality of the raw material and/or the desired production. The modular method of construction of the machine makes it easier to carry out such refinements before the transfer to production on an industrial scale.

Finally, in some cases, it could be advantageous to reintroduce at the inlet of the sleeve, together with the material to be processed, a certain quantity of dry material discharged at the downstream end of the sleeve. This recycling of at least some of the crackling would make it possible to increase the proportion of solids, in particular making it easier to drive the material in the flights of the screws.

Although it is advantageous to arrange the degassing orifice substantially in the central part of the melting zone, it may be unnecessary to increase the temperature of the material after degassing. In this case, the degassing orifice would simply be followed by a section which takes up and compresses the material which precedes the filtering zone. Likewise, although, as indicated, it is preferable to cool the feed zone to prevent premature melting of the material, in some cases this cooling could prove superfluous.

Finally, although the extrusion of the residual material via a die located at the outlet of the machine makes it possible, on the one hand, to shape the crackling to the desired cross-section and, on the other hand, to increase the expulsion effect of the fat, the residual material could be discharged freely, simply by leaving the downstream end of the sleeve open, the expulsion effect being achieved essentially by means of the kneading discs 38.

We claim:

1. An apparatus for extracting fat from an animal material consisting of cells limited by a protein tissue and containing at least fatty material and water, said apparatus comprising a screw conveyor comprising at least two conveyor screws (2) provided with helical flights (3) rotatably entrained within an elongate sleeve (1) comprising at least the following successive zones in a conveying direction of said conveyor screws:

(a) an upstream feed zone (A) in which said sleeve is provided with an orifice (11) for introducing animal material, and with means (12) for cooling by circulation of a heat exchange fluid;

(b) a central melting zone (B) in which said sleeve is provided with heating means (13) and, in a central part of said sleeve, with a degassing orifice (14) opening widely onto said conveyor screws (2), said helical flights (3) defining, from upstream to downstream, at least the following successive stages:

(i) a first, pressure increase stage ($B_1$);

(ii) a second, expansion stage ($B_2$) in line with said degassing orifice (14); and (iii) a third, pressure increase stage ($B_3$) located downstream of said degassing orifice (14); and (c) at least one downstream extraction zone (C) in which said sleeve (1) is provided with filtering walls (16), said helical flights (3) determining a pressure increase enabling expulsion of melted fat and its discharge through said filtering walls (16), a residue being discharged through an orifice (17) located at a downstream end of said sleeve (1).

2. A fat extraction apparatus as claimed in claim 1, wherein, in the melting zone (B), the screws (2) are provided with flights or other peripheral members (3) which define successively, in the conveying direction, a pressure increase section (32), a first braking section (33) with kneading and shearing for forming a continuous plug impervious to the water vaporization pressure, a pressurized kneading section (34), an expansion section (35) and a second braking section (36) with an increase in pressure.

3. An extraction apparatus as claimed in claim 1, wherein, in the first braking section, the screws are provided with flights (33) of a pitch opposing the conveying direction and provided with apertures (330) for the downstream passage of a controlled flow of material, with a shearing effect, and wherein, in the second braking section, the screws consist of a stack of kneading discs (36).

4. An extraction apparatus as claimed in claim 1, wherein, in the extraction zone (C), the screws consist of a stack (38) of kneading discs.

* * * * *

UNITED STATES PATENT AND TRADEMARK OFFICE
CERTIFICATE OF CORRECTION

PATENT NO. : 4,846,054

DATED : July 11, 1989

INVENTOR(S) : Christian MANGE and Jean-Yves ROZE

It is certified that error appears in the above-identified patent and that said Letters Patent is hereby corrected as shown below:

At [75], line 2, change "Toze" to --Roze--.

Signed and Sealed this

Sixteenth Day of January, 1990

*Attest:*

JEFFREY M. SAMUELS

*Attesting Officer*

*Acting Commissioner of Patents and Trademarks*